United States Patent
Lee et al.

(10) Patent No.: US 10,609,025 B2
(45) Date of Patent: Mar. 31, 2020

(54) SYSTEM AND METHOD FOR PROVIDING SIMULATED ENVIRONMENT

(71) Applicant: HTC Corporation, Taoyuan (TW)

(72) Inventors: Hsin-Hao Lee, Taoyuan (TW); Ching-Hao Lee, Taoyuan (TW)

(73) Assignee: HTC Corporation, Taoyuan (TW)

( * ) Notice: Subject to any disclaimer, the term of this patent is extended or adjusted under 35 U.S.C. 154(b) by 164 days.

(21) Appl. No.: 15/823,608

(22) Filed: Nov. 28, 2017

(65) Prior Publication Data

US 2018/0295130 A1    Oct. 11, 2018

Related U.S. Application Data

(60) Provisional application No. 62/482,207, filed on Apr. 6, 2017.

(51) Int. Cl.
| | |
|---|---|
| H04N 7/16 | (2011.01) |
| H04L 29/06 | (2006.01) |
| G06F 21/32 | (2013.01) |
| G06F 21/62 | (2013.01) |
| G06Q 10/10 | (2012.01) |
| G06T 19/20 | (2011.01) |
| G06T 19/00 | (2011.01) |
| G06F 16/435 | (2019.01) |
| G06F 3/01 | (2006.01) |

(52) U.S. Cl.
CPC .......... *H04L 63/0861* (2013.01); *G06F 3/013* (2013.01); *G06F 16/436* (2019.01); *G06F 21/32* (2013.01); *G06F 21/629* (2013.01); *G06F 21/6218* (2013.01); *G06Q 10/103* (2013.01); *G06T 19/003* (2013.01); *G06T 19/20* (2013.01); *G06T 2219/2021* (2013.01)

(58) Field of Classification Search
USPC .......................................... 726/28
See application file for complete search history.

(56) References Cited

U.S. PATENT DOCUMENTS

| | | | |
|---|---|---|---|
| 6,943,665 B2* | 9/2005 | Chornenky | G07C 9/00111 283/70 |
| 8,541,745 B2* | 9/2013 | Dickinson | G04G 21/00 250/340 |
| 9,122,321 B2* | 9/2015 | Perez | G06F 3/033 |

(Continued)

FOREIGN PATENT DOCUMENTS

| | | |
|---|---|---|
| CN | 106161966 A | 11/2016 |
| CN | 106506446 A | 3/2017 |
| TW | 201643506 A | 12/2016 |

OTHER PUBLICATIONS

Corresponding Taiwan office action dated Oct. 31, 2018.
Corresponding Chinese office action dated Jul. 17, 2019.

*Primary Examiner* — Amare F Tabor
(74) *Attorney, Agent, or Firm* — CKC & Partners Co., LLC

(57) ABSTRACT

Present disclosure relates to a system for providing a simulated environment and a method thereof. The system comprises a wearable device and a computing unit. The wearable device is configured to output a scenario of the simulated environment and to obtain a biometric characteristic. The computing unit is configured to determine a permission level according to the biometric characteristic, and to determine whether to conceal at least one portion of a virtual object which is being displayed in the scenario according to the permission level.

14 Claims, 7 Drawing Sheets

(56) References Cited

U.S. PATENT DOCUMENTS

| | | | |
|---|---|---|---|
| 9,591,427 B1 | 3/2017 | Lyren et al. | |
| 9,870,060 B2 * | 1/2018 | Marggraff | G06F 3/017 |
| 9,992,883 B2 * | 6/2018 | Peek | G02B 6/42 |
| 10,156,900 B2 * | 12/2018 | Publicover | G06F 21/64 |
| 10,299,520 B1 * | 5/2019 | Shaffer | A41D 13/0053 |
| 2006/0115130 A1 | 6/2006 | Kozlay | |
| 2014/0337634 A1 | 11/2014 | Starner et al. | |
| 2016/0342782 A1 | 11/2016 | Mullins et al. | |
| 2017/0161720 A1 * | 6/2017 | Xing | G06Q 20/3278 |
| 2017/0287240 A1 * | 10/2017 | Nikitin | G07C 9/00007 |
| 2017/0337352 A1 * | 11/2017 | Williams | G06F 21/10 |

* cited by examiner

SYSTEM AND METHOD FOR PROVIDING SIMULATED ENVIRONMENT

CROSS-REFERENCE TO RELATED APPLICATION

This application claims priority to U.S. Provisional Application Ser. No. 62/482,207, filed on Apr. 6, 2017, which is herein incorporated by reference.

BACKGROUND

Field of Invention

Present disclosure relates to a computing system and a method thereof, especially a system and a method for providing a simulated environment to multiple users.

Description of Related Art

Virtual reality technology is very powerful when being applied to a group of people, especially when being applied for holding a conference or a workshop. It is much intuitive for having a prototype or a blueprint being presented in a visible three dimensional space rather than only on a two dimensional picture. However, there are still some unsolved problems for providing a virtual reality environment to multiple users located in different places.

SUMMARY

The disclosure relates to a system for providing a simulated environment. The system comprises a wearable device and a computing unit. The wearable device is configured to output a scenario of the simulated environment and to obtain a biometric characteristic. The computing unit is configured to determine a permission level according to the biometric characteristic, and to determine whether to conceal at least one portion of a virtual object which is being displayed in the scenario according to the permission level.

Another aspect of present disclosure is to provide a method for providing a simulated environment. The method comprises following steps: outputting, by a wearable device, a scenario of the simulated environment; obtaining, by the wearable device, a biometric characteristic; determining, by a computing unit, a permission level according to the biometric characteristic; and determining, by the computing unit, whether to conceal at least one portion of a virtual object which is being displayed in the scenario according to the permission level.

It is to be understood that both the foregoing general description and the following detailed description are by examples, and are intended to provide further explanation of the disclosure as claimed.

BRIEF DESCRIPTION OF THE DRAWINGS

Present disclosure can be more fully understood by reading the following detailed description of the embodiment, with reference made to the accompanying drawings as follows.

DETAILED DESCRIPTION

Figure 1:
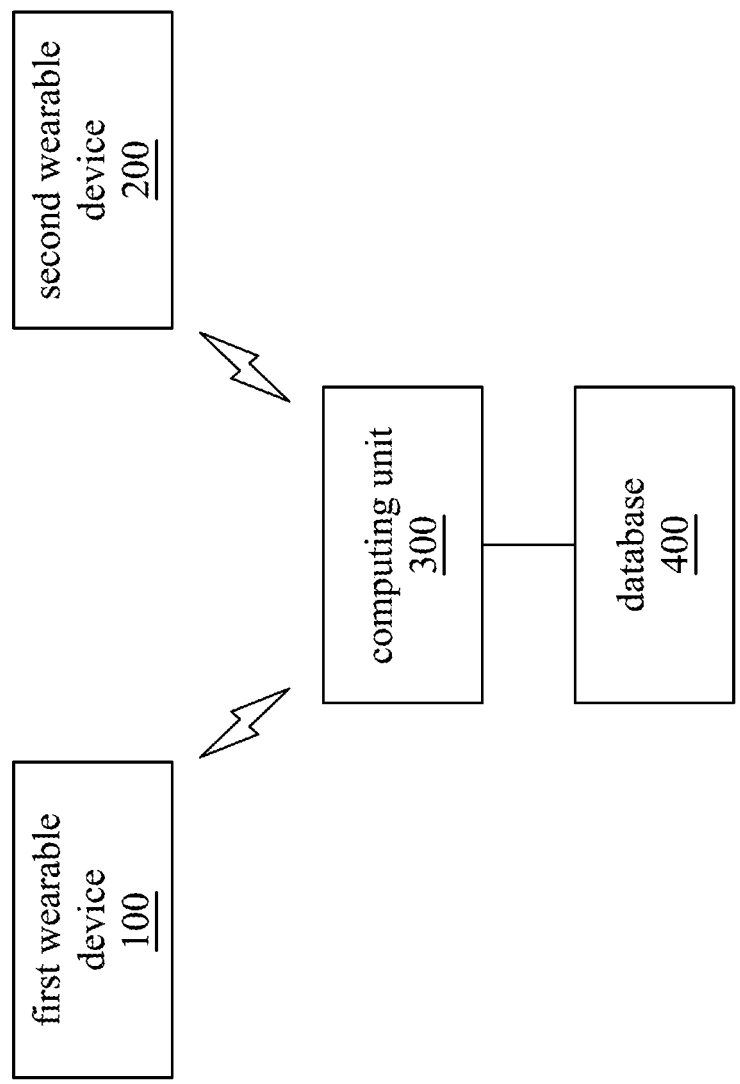
FIG. 1 is a schematic diagram of a system for providing a simulated environment according to some embodiments of present disclosure.

Reference will now be made in detail to the present embodiments of the disclosure, examples of which are illustrated in the accompanying drawings. Wherever possible, the same reference numbers are used in the drawings and the description to refer to the same or like parts.

The terms used in this specification generally have their ordinary meanings in the art and in the specific context where each term is used. The use of examples in this specification, including examples of any terms discussed herein, is illustrative only, and in no way limits the scope and meaning of the disclosure or of any exemplified term. Likewise, the present disclosure is not limited to various embodiments given in this specification.

As used herein, the terms "comprising," "including," "having," and the like are to be understood to be open-ended, i.e., to mean including but not limited to.

Reference throughout the specification to "one embodiment" or "an embodiment" means that a particular feature, structure, implementation, or characteristic described in connection with the embodiment is included in at least one embodiment of the present disclosure. Thus, uses of the phrases "in one embodiment" or "in an embodiment" in various places throughout the specification are not necessarily all referring to the same embodiment. Furthermore, the particular features, structures, implementation, or characteristics may be combined in any suitable manner in one or more embodiments.

In the following description and claims, the terms "coupled" and "connected", along with their derivatives, may be used. In particular embodiments, "connected" and "coupled" may be used to indicate that two or more elements are in direct physical or electrical contact with each other, or may also mean that two or more elements may be in indirect contact with each other. "Coupled" and "connected" may still be used to indicate that two or more elements cooperate or interact with each other.

FIG. 1 is a schematic diagram of a system for providing a simulated environment according to some embodiments of present disclosure. Said simulated environment is an environment built with virtual objects illustrated by computing devices, for example, may be a virtual reality environment, an augmented reality environment or a mixed reality environment. As shown in FIG. 1, a first wearable device 100 and a second wearable device 200 are in communication with a computing unit 300. In an embodiment, the first wearable device 100 is carried by a first user and the second wearable device 200 is carried by a second user. The first wearable device 100 is configured to output a first scenario of a virtual reality environment to the first user, wherein the first scenario being displayed shows a partial view of the virtual reality environment corresponding to the viewpoint of the first wearable device 100. The first scenario may be updated according to the viewing that changed in response to the movement of the first user. In the same manner, the second wearable device 200 is configured to output a second scenario of the virtual reality environment to the second user, wherein the second scenario being displayed shows a partial view of the virtual reality environment corresponding to the viewpoint of the second wearable device 200. The second scenario may be updated according to the viewing that changed in response to the movement of the second user. The first wearable device 100 and the second wearable device 200 may receive signals from the computing unit 300 in order to display or update virtual objects or backgrounds in the first scenario and the second scenario.

In the embodiment, since the first scenario and the second scenario are directed to the same virtual reality environment, when a virtual object is being displayed in the virtual reality environment, the first user may observe the virtual object from a first viewpoint corresponding to the first scenario, and the second user may observe the virtual object from a second viewpoint, which may be different from the first viewpoint, corresponding to the second scenario.

In the embodiment, the first wearable device 100 is also configured to obtain a first biometric characteristic from the first user. The first biometric may be an iris characteristic, obtained by an optical sensor being configured in the first wearable device 100 for detecting at least an eye of the first user. The first biometric characteristic may be sent to the computing unit 300, and the computing unit 300 may determine a first permission level of the first user according to the first biometric characteristic. In the same manner, the second wearable device 200 is also configured to obtain a second biometric characteristic from the second user. The second biometric characteristic being retrieved from the second user, such as an iris characteristic may be sent to the computing unit 300 as well. The computing unit 300 may determine a second permission level of the second user according to the second biometric characteristic being retrieved.

In the embodiment, a database 400 is electrically coupled to the computing unit 300. The database 400 is configured to store a permission list, which is a record of relationships between permission levels and biometric characteristics. In other words, the permission list records the genders, tasks, titles or identities of users, which may be determined by the biometric characteristics, and the permission levels that they are granted to. When computing unit 300 receives the first biometric characteristic from the first wearable device 100, the computing unit 300 may retrieve the permission list from the database 400, and the computing unit 300 may determine the first permission level to the first user according to the information in the permission list. In the same manner, when computing unit 300 receives the second biometric characteristic from the first second wearable device 200, the computing unit 300 may retrieve the permission list and determine the second permission level to the second user according to the information in the permission list.

In the embodiment, the permission levels regulate which portion of the virtual object a specific user may or may not observe. For example, in the embodiment, the first user and the second user are both participants of a project. The first user is a project manager so the first permission level granted to the first user is a supreme permission level. User being determined as an owner of the supreme permission level may observe the entire virtual object. Through the first wearable device 100, the first biometric characteristic of the first user may be sent to the computing unit 300. The computing unit 300 may retrieve the permission list from the database 400 and determine the first user as the first permission level, and the computing unit 300 may determine not to conceal any portion of the virtual object. As such, the first user may observe the entire virtual object in the first scenario as it should be presented.

On the other hand, the second user is a contract engineer participates in partial design of the virtual object. For the sake of maintaining confidentiality, the other parts of the virtual object are forbidden to be disclosed to the second user. In order to do so, the second user is granted with the second permission level that only the parts he participates in may be presented. User being determined as an owner of the second permission level may observe the virtual object with some portions being concealed. Through the second wearable device 200, the second biometric characteristic of the second user may be sent to the computing unit 300. The computing unit 300 may retrieve the permission list from the database 400 and determine the second user as the second permission level, and the computing unit 300 may determine to conceal some portions of the virtual object. As such, the second user may not observe the entire virtual object in the second scenario as it should be presented.

In some embodiments, the biometric characteristics include fingerprints of the users or habitual actions of the users. For example, the first wearable device 100 and the second wearable device 200 may be configured with some fingerprint detectors. Before the first scenario and the second scenario being provided to the first wearable device 100 and the second wearable device 200, the first user and the second user have to put their fingers on the fingerprint detectors. The fingerprints of the first user and the second user may then be sent to the computing unit 300. Then the computing unit 300 may determine the permission levels for the users according to the obtained fingerprints. For example, the first wearable device 100 and the second wearable device 200 may be configured with some motion detectors. When the first user wears the first wearable device 100 and the second user wears the second wearable device 200, their habitual actions may be collected by the motion detectors and sent to the computing unit 300. Then the computing unit 300 may determine the permission levels for the users according to the obtained habitual actions.

However, it should be understood that the computing unit 300 illustrated in FIG. 1 is only an example. In some embodiments, the computing unit 300 may be a CPU, GPU, or some control unit configured in the first wearable device 100 or the second wearable device 200. Depends on which wearable device is configured with the computing unit 300, the biometric characteristics will be sent to that wearable device and being processed by the computing unit 300.

Figure 2:
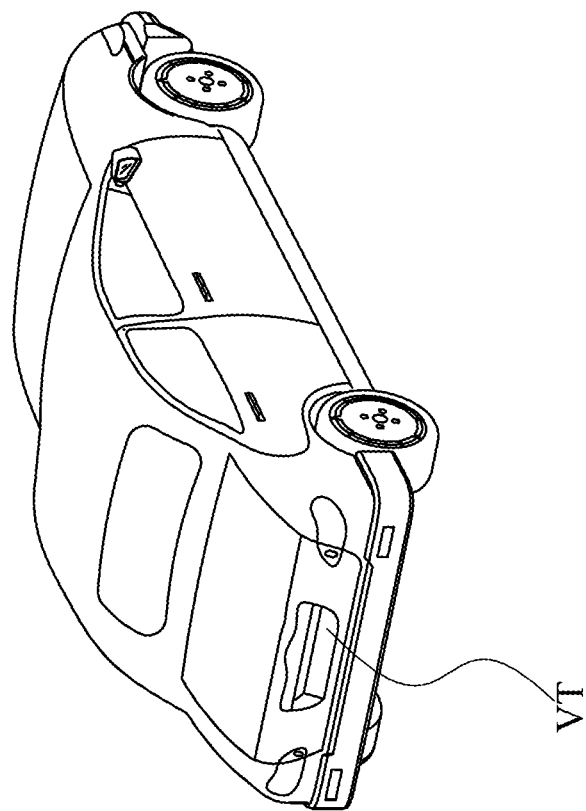
FIG. 2 is a schematic diagram of a system for providing a simulated environment according to some embodiments of present disclosure.

FIG. 2 is a schematic diagram of a system for providing a simulated environment according to some embodiments of present disclosure. As can be seen in the figure, a first avatar V1 is being illustrated behind a virtual roadster VT in the virtual reality environment. The figure illustrates the viewpoint of the first user described in the embodiment of FIG. 1 being presented with the first scenario. The first avatar V1 is provided corresponding to the first user wearing the first wearable device 100 in the real world. As mentioned in the embodiment of FIG. 1, the first wearable device 100 may collect the first biometric characteristic from the first user and send the first biometric characteristic to the computing unit 300. The computing unit 300 may retrieve the permission list from the database 400 to determine the permission level for the first user. Since the first user is being determined as the owner of the first permission level, through the first wearable device 100 the first user may observe the entire rear portion of the virtual roadster VT from the viewpoint of the first avatar V1 in the virtual reality environment.

Figure 3:
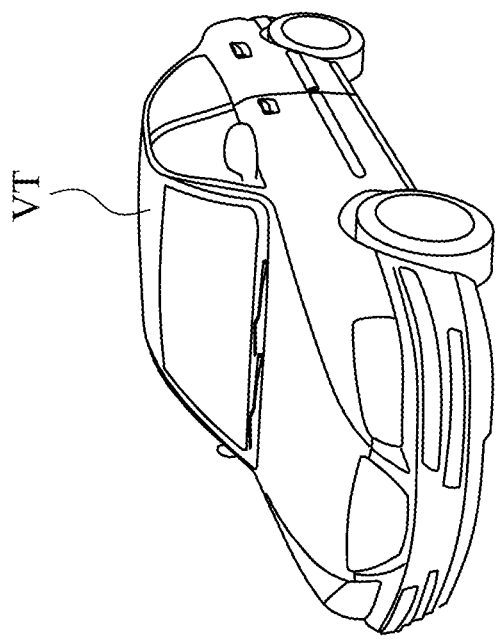
FIG. 3 is a schematic diagram of a system for providing a simulated environment according to some embodiments of present disclosure.

FIG. 3 is a schematic diagram of a system for providing a simulated environment according to some embodiments of present disclosure. As can be seen in the figure, the first avatar V1 is being illustrated in front of the virtual roadster VT in the virtual reality environment. The figure illustrates another viewpoint of the first user described in the embodiment of FIG. 1 being presented with the first scenario. The first avatar V1 is provided corresponding to the first user wearing the first wearable device 100 in the real world. As mentioned in the embodiment of FIG. 1, the first wearable device 100 may collect the first biometric characteristic from the first user and send the first biometric characteristic to the computing unit 300. The computing unit 300 may retrieve the permission list from the database 400 to determine the permission level for the first user. Since the first user is being determined as the owner of the first permission level, through the first wearable device 100 the first user may observe the entire front portion of the virtual roadster VT from the viewpoint of the first avatar V1 shown in FIG. 3.

In the embodiments shown in FIG. 2 and FIG. 3, it can be seen that the first user having the first permission level may see any portion of the virtual roadster VT via the first scenario in the virtual reality environment, this is because the first biometric characteristic being retrieved from the first user determines that the first user is recognized as the manager of the project.

Figure 4:
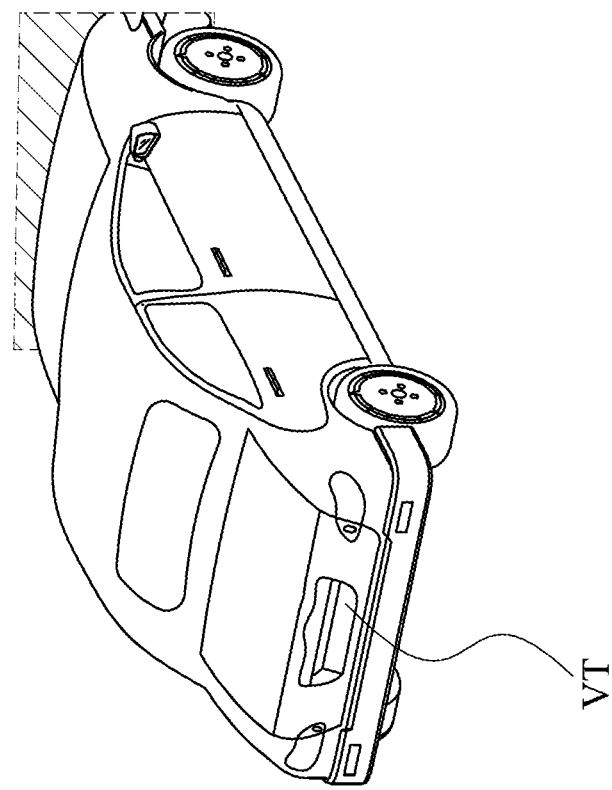
FIG. 4 is a schematic diagram of a system for providing a simulated environment according to some embodiments of present disclosure.

FIG. 4 is a schematic diagram of a system for providing a simulated environment according to some embodiments of present disclosure. As can be seen in the FIG. 4, a second avatar V2 is being illustrated behind the virtual roadster VT in the virtual reality environment. The figure illustrates the viewpoint of the second user described in the embodiment of FIG. 1 being presented with the second scenario. As mentioned in the embodiment of FIG. 1, the second wearable device 200 may collect the second biometric characteristic from the second user and send the second biometric characteristic to the computing unit 300. The computing unit 300 may retrieve the permission list from the database 400 to determine the permission level for the second user. As mentioned, according to the permission list, the second user may be determined as the owner of the second permission level. The second permission level may only see the virtual object being partially concealed in the second scenario. Since the second user is the engineer who participates in the rear portion of the virtual roadster VT, the second user may observe the entire rear portion of the virtual roadster VT with the second permission level. In the embodiment, the second user may observe the entire rear portion of the virtual roadster VT from the viewpoint of the second avatar V2 through the second wearable device 200.

Figure 5:
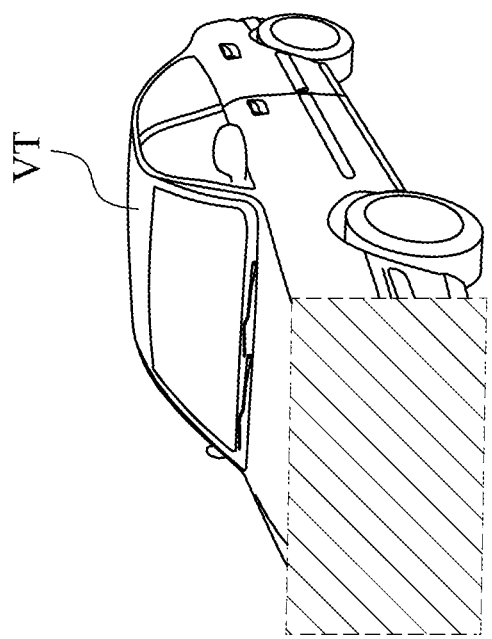
FIG. 5 is a schematic diagram of a system for providing a simulated environment according to some embodiments of present disclosure.
Figure 5:
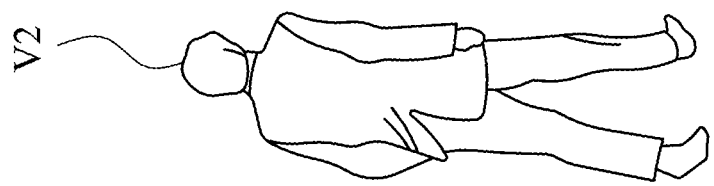

FIG. 5 is a schematic diagram of a system for providing a simulated environment according to some embodiments of present disclosure. As can be seen in FIG. 5, the second avatar V2 is being illustrated in front of the virtual roadster VT in the virtual reality environment. The figure illustrates the viewpoint of the second user described in the embodiment of FIG. 1 being presented with the second scenario. As mentioned in the embodiment of FIG. 1, the second wearable device 200 may collect the second biometric characteristic from the second user and send the second biometric characteristic to the computing unit 300. The computing unit 300 may retrieve the permission list from the database 400 to determine the permission level for the second user. As mentioned, according to the permission list, the second user may be determined as the owner of the second permission level. The second permission level may only see the virtual object being partially concealed in the second scenario. Since the second user is the engineer who participates in the rear portion of the virtual roadster VT, the second user may not observe the front portion of the virtual roadster VT. In the embodiment, the first user may observe the virtual roadster VT with its front portion being concealed from the viewpoint of the second avatar V2. Comparing FIG. 5 with FIG. 3, it is apparent that the front portion of the virtual roadster VT in FIG. 5 is being cut off. As shown in FIG. 5, the entire head of the virtual roadster VT is unobservable from the viewpoint of the second avatar V2 in the virtual reality environment.

Figure 6:
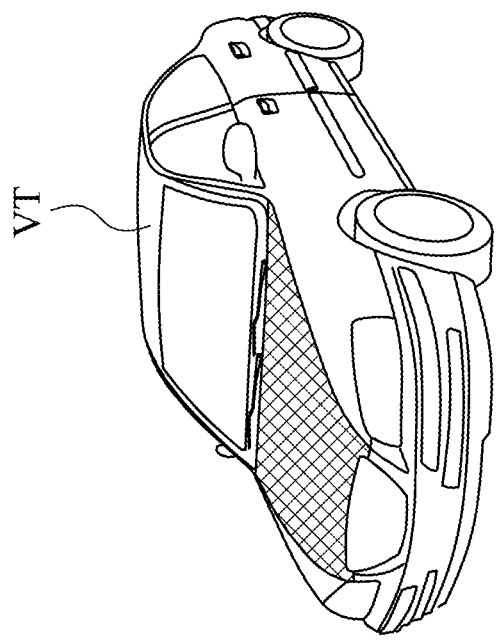
FIG. 6 is a schematic diagram of a system for providing a simulated environment according to some embodiments of present disclosure.
Figure 6:
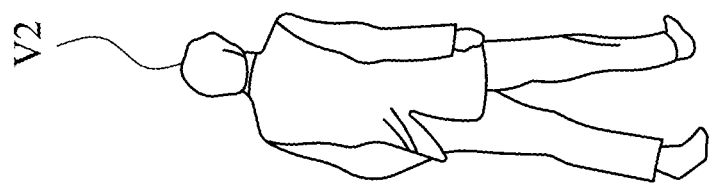

The embodiment illustrated in FIG. 5 is an example for concealing at least one portion of the virtual roadster VT. In other embodiments, the computing unit 300 may conceal the specific portions of the virtual roadster VT by various approaches. For instance, the concealment may be applied by altering colors of specific portions of the virtual roadster VT, as shown in FIG. 6. In the embodiment, looking from the viewpoint of the avatar V2, which is corresponding to the second user, portions of the virtual roadster VT are being painted with colors to make these portions unobservable to the second user. In other embodiments, the act of concealment may be applied by excavating some specific portions from the virtual roadster VT. The concealment may be applied by altering the surface on some specific portions of the virtual roadster VT. The concealment may be applied by covering some specific portions of the virtual roadster VT with other virtual objects. However, it should be understood that the concealments may be applied through many other known approaches but not limited to the aforementioned applications.

Figure 7:
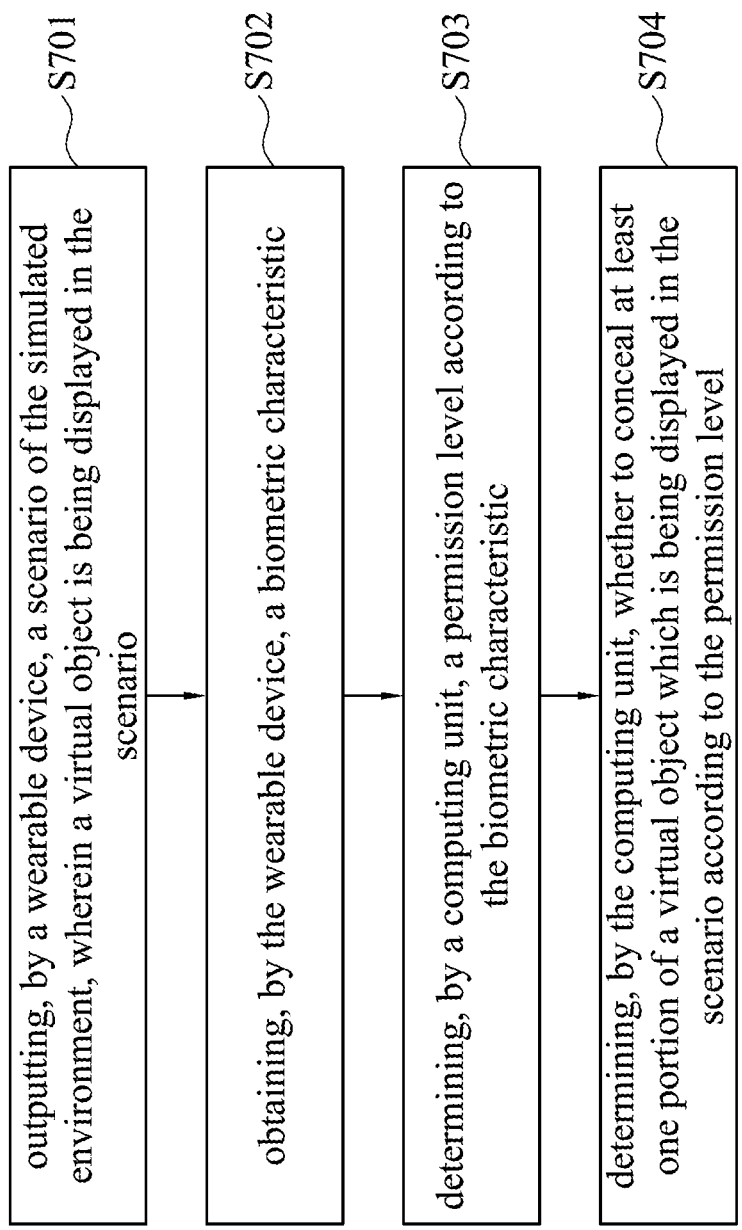
FIG. 7 is a flow chart of a method for providing a simulated environment according to some embodiments of present disclosure.

FIG. 7 is a flow chart of a method for providing a simulated environment to multiple users according to some embodiments of present disclosure. The steps of the method will be listed and explained in detail in following segments.

Step S701: outputting, by a wearable device, a scenario of the simulated environment, wherein a virtual object is being displayed in the scenario. As shown in the embodiments from FIG. 1 to FIG. 6, when the first user wears the first wearable device 100, the computing unit 300 may provide the first scenario of the virtual reality environment to the first user. In the same manner, when the second user wears the second wearable device 200, the computing unit 300 may provide the second scenario of the virtual reality environment to the second user. The virtual roadster VT is being displayed in both the first scenario and the second scenario, the difference is that portions of the virtual roadster VT may be concealed according to the permission levels of the users.

Step S702: obtaining, by the wearable device, a biometric characteristic. As shown in the embodiments from FIG. 1 to FIG. 6, the first wearable device 100 may obtain the first biometric characteristic from the first user, and the second wearable device 200 may obtain the second biometric characteristic from the second user. The first biometric characteristic and the second biometric characteristic may then be sent to the computing unit 300.

Step S703: determining, by a computing unit, a permission level according to the biometric characteristic. As shown in the embodiments from FIG. 1 to FIG. 6, after the first biometric characteristic and the second biometric characteristic being sent to the computing unit 300, the computing unit 300 may retrieve the permission list from the database 400 and start to determine permission levels for the users. As mentioned in the exemplary embodiments, the first user is being determined as the owner of the first permission level, and the second user is being determined as the owner of the second permission level. The permission levels to the users are being determined according to the permission list, such permission list records the relationship between the permission levels and biometric characteristics.

Step S704: determining, by the computing unit, whether to conceal at least one portion of the virtual object in the scenario according to the permission level. As shown in the embodiments from FIG. 1 to FIG. 6, users may see different portions of the virtual roadster VT according to their permission levels. In the embodiment, since the first user is being determined as owning the first permission level, whenever from any viewpoint in the virtual reality environment, the first user sees the entire virtual roadster VT, as illustrated in FIG. 2 and FIG. 3. However, since the second user is being determined as owning the second permission level, the first user may see the rear portion but not the front portion of the virtual roadster VT, as illustrated in FIG. 4, FIG. 5 and FIG. 6.

As described, present disclosure provides an approach to make specific parts of a virtual object being concealed according to the biometric characteristics of users. The method makes portions of the virtual object not being disclosed to some users without enough permission levels, provides a solid solution for establishing information security in the simulated environment.

Although the present disclosure has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims.

What is claimed is:

1. A system for providing a simulated environment, comprising:
   a wearable device, configured to output a scenario of the simulated environment and to obtain a biometric characteristic; and
   a computing unit, configured to determine a permission level according to the biometric characteristic, and to determine whether to conceal at least one portion of a virtual object which is being displayed in the scenario according to the permission level,
   wherein concealing the at least one portion of the virtual object comprising excavating the at least one portion from the virtual object, cutting the at least one portion from the virtual object, and altering a surface on the at least one portion of the virtual object.

2. The system of claim 1, further comprising:
   a database, configured to store a permission list, wherein the permission list records a relationship between the permission level and the biometric characteristic, wherein the computing unit is configured to determine the permission level according to the permission list.

3. The system of claim 1, wherein the wearable device comprises an optical sensor, wherein the optical sensor is configured for obtaining an iris characteristic as the biometric characteristic.

4. The system of claim 1, wherein the biometric characteristic comprises fingerprint patterns or habitual actions.

5. The system of claim 1, wherein the permission level is determined by genders, tasks, titles or identities.

6. The system of claim 1, wherein the computing unit is configured to conceal the at least one portion of the virtual object by altering a color of the at least one portion of the virtual object.

7. The system of claim 1, wherein the computing unit is configured to conceal the at least one portion of the virtual object by covering the at least one portion of the virtual object with other virtual objects.

8. A method for providing a simulated environment, comprising:
   outputting, by a wearable device, a scenario of the simulated environment;
   obtaining, by the wearable device, a biometric characteristic;
   determining, by a computing unit, a permission level according to the biometric characteristic; and
   determining, by the computing unit, whether to conceal at least one portion of a virtual object which is being displayed in the scenario according to the permission level,
   wherein concealing the at least one portion of the virtual object comprising excavating the at least one portion from the virtual object, cutting the at least one portion from the virtual object, and altering a surface on the at least one portion of the virtual object.

9. The method of claim 8, further comprising:
   retrieving, by the computing unit, a permission list from a database, wherein the permission list records a relationship between the permission level and the biometric characteristic.

10. The method of claim 8, further comprising:
    obtaining, by an optical sensor configured in the wearable device, an iris characteristic as the biometric characteristic.

11. The method of claim 8, wherein the biometric characteristic comprises fingerprint patterns or habitual actions.

12. The method of claim 8, wherein the permission level is determined by genders, tasks, titles or identities.

13. The method of claim 8, wherein the computing unit is configured to conceal the at least one portion of the virtual object by altering a color of the at least one portion of the virtual object.

14. The method of claim 8, wherein the computing unit is configured to conceal the at least one portion of the virtual object by covering the at least one portion of the virtual object with other virtual objects.

* * * * *